United States Patent [19]

Keeney et al.

[11] 4,335,569
[45] Jun. 22, 1982

[54] REEL TO BEDKNIFE ADJUSTMENT SYSTEM

[75] Inventors: Donald A. Keeney, Bloomington; David J. Scherbring, Shakopee, both of Minn.

[73] Assignee: The Toro Company, Minneapolis, Minn.

[21] Appl. No.: 199,666

[22] Filed: Oct. 22, 1980

[51] Int. Cl.³ .................................................. A01D 55/20
[52] U.S. Cl. ....................................... 56/249; 364/475; 56/10.2
[58] Field of Search ................... 56/249, 10.2, 249.5, 56/250, 251, 252, 253, 254; 364/475

[56] References Cited

U.S. PATENT DOCUMENTS

| | | | |
|---|---|---|---|
| 3,187,492 | 6/1965 | Bergen | 56/249 |
| 3,591,776 | 7/1971 | Sylvester | 364/475 |
| 3,680,293 | 8/1972 | Klemenhagen | 56/249 |
| 4,226,147 | 10/1980 | Kumzi | 364/475 |

*Primary Examiner*—Robert A. Hafer
*Attorney, Agent, or Firm*—James W. Miller

[57] ABSTRACT

A reel type mower (2) has a rotatable cutting reel (4) and a cooperating bedknife (8). A control system (30) automatically positions the bedknife (8) relative to the cutting reel (4). An electrical potential is normally maintained between the bedknife (8) and reel (4). The control system (30) monitors this electrical potential and counts the number of times the electrical potential disappears during a predetermined time interval. If the counted value is different from the reference value, an actuator (32) turns an adjustment shaft (42) to change the position of bedknife (8) relative to reel (4).

15 Claims, 7 Drawing Figures

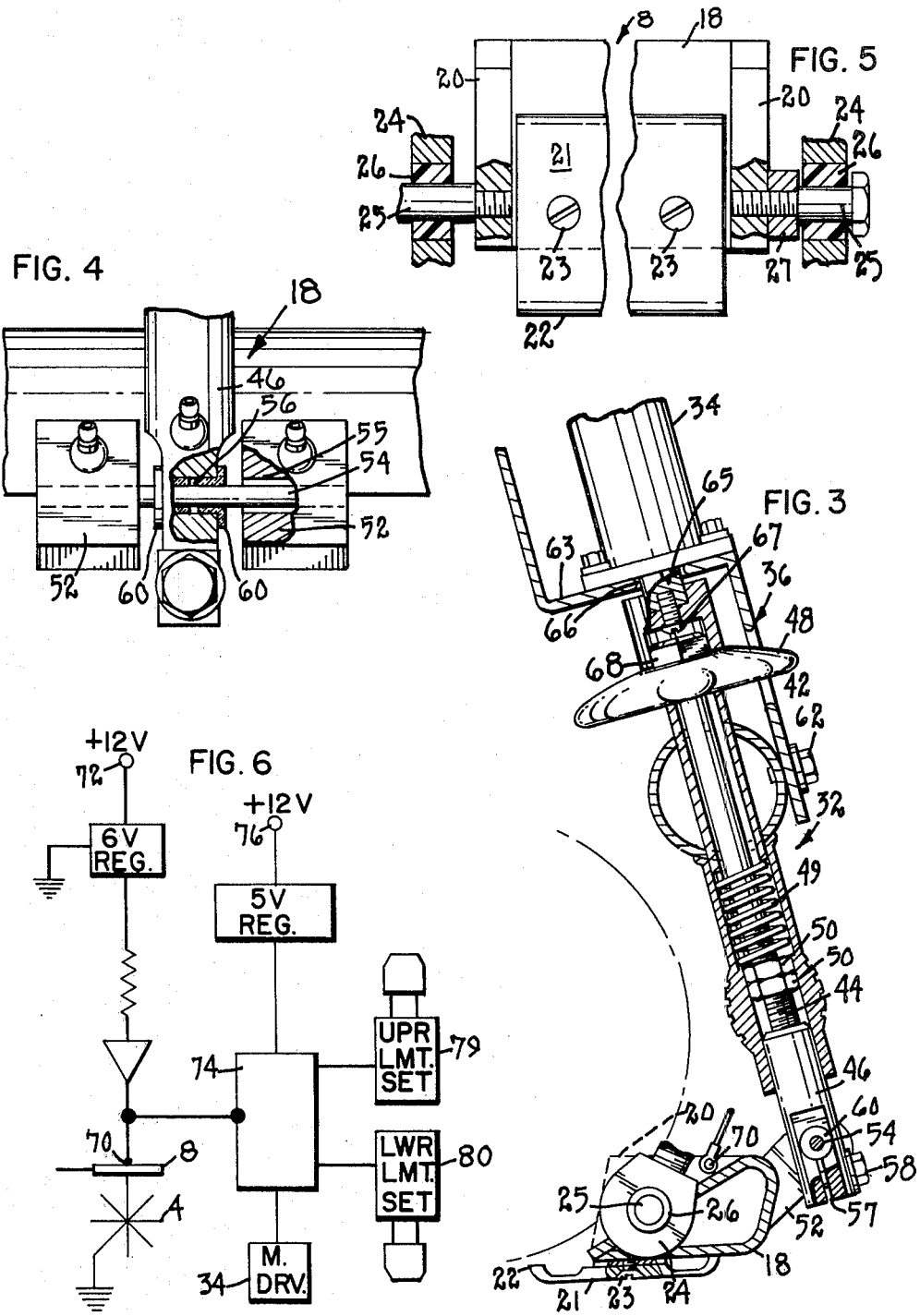

REEL TO BEDKNIFE ADJUSTMENT SYSTEM

TECHNICAL FIELD

This invention relates to a reel type mower apparatus having a rotatable cutting reel and cooperating bedknife. More particularly, this invention relates to a system or control means for adjusting the relative positions between the bedknife and the cutting reel in this type of mower.

BACKGROUND OF THE INVENTION

Mowing devices having a rotatable cutting reel for mowing grass or other vegetation are well known. The cutting reel usually comprises a plurality of curved cutting blades rigidly secured together for rotation as a unit. An elongated bedknife extends along the length of the cutting reel and cooperates with the cutting blades as the blades pass over the bedknife to sever the vegetation. In effect, the vegetation is sheared off as the cutting blades press the vegetation up against the fixed bedknife and then sever the vegetation.

The bedknife and cutting reel must be properly positioned relative to one another for this type of mowing apparatus to function properly. Many of those skilled in this art believe that there should be some contact between the bedknife and the cutting blade. However, such contact should be kept within a precise range. Too much contact results in undue wear on the bedknife and cutting blades and also decreases the quality of cut. Too little contact results in a poor quality of cut.

Many of the prior art reel type mowers have utilized some type of means for adjusting the position of the bedknife relative to the cutting reel or vise versa. The great majority of these adjustment systems comprise threaded screws or the like for physically moving the bedknife towards or away from the cutting reel. Such systems must be manually adjusted before a mowing operation begins. Usually, the operator of the mowing apparatus has to disengage the cutting reel from its drive and then rotate the cutting reel by hand so that the blades of the reel pass over the bedknife. Then, using experience and listening to the sound of the blades as they pass over the bedknife, the operator then rotates the adjustment screw until he feels that the bedknife is properly positioned. Sometimes, a piece of paper inserted between the bedknife and the cutting reel is used to determine when the bedknife is properly positioned by looking at how the cutting blade severs such a piece of paper.

This method of adjusting the cutting reel relative to a bedknife has numerous flaws. Since the determination of when the bedknife is properly positioned is totally subjective, an experienced operator must usually make the adjustment for it to be correct. Inexperienced operators cannot usually properly adjust a edknife with any degree of reliability. Insofar as such an inexperienced operator does not correctly adjust the cutting reel, undue wear or poor quality of cut will result.

Moreover, even for an exxperienced operator, this adjustment procedure is relatively time consuming. It requires a careful manual adjustment of each cutting reel by turning the cutting reel by hand and listening to the sound of the cutting blades and then adjusting, as many times as may be necessary, the position of the bedknife to achieve the right sound. This can take a few minutes for an experienced operator and much longer for an inexperienced one. The labor spent in such an adjustment operation is significant especially when one considers that many devices have a plurality of these types of cutting units. For example, The Toro Company, which is the assignee of the present invention, manufactures some products which carry up to seven cutting reels. Considerable man hours can thus be spent in adjusting such cutting reels. This is disadvantageous.

Another disadvantage of the manual method of adjusting a bedknife to a cutting reel is that this adjustment must be done while the machine is shut down. It is usually done before the mowing operation commences. However, it is possible, and does occur, that the bedknife will move relative to the cutting reel during operation of the mowing machine. This might be caused by vibration or by the cutting unit passing over a rock or the like in the area being cut. Once the initial adjustment changes, the cutting unit will be not properly adjusted for the remainder of the mowing operation. There is no way using the manual method of adjustment to correct the position of the bedknife during the actual mowing operation itself.

SUMMARY OF THE INVENTION

One aspect of this invention is to provide a reel type mower in which the bedknife can be adjusted relative to the reel during the actual mowing operation itself, i.e. during powered rotation of the reel. Moreover, it is another aspect of this invention to provide an adjustment system for a bedknife in which the adjustment can be automatically made by even an inexperienced operator without relying upon personal or subjective judgements of adjustablity.

This invention relates to a reel type mower which includes a rotatable cutting reel having at least one cutting element. An elongated bedknife is located adjacent the cutting reel for cooperation with the reel to sever vegetation therebetween. Either the bedknife or the cutting reel is movable relative to the other component to define a movable component whose position can be varied. A control means is provided for adjusting the position of the movable component during rotation of the cutting reel. This control means includes a means for monitoring during rotation of the cutting reel a selected physical parameter of either the cutting reel or the bedknife which indicates whether or not the bedknife is properly adjusted relative to the cutting reel. The control means further includes an actuator means controlled by the monitoring means for moving the movable component towards or away from the other component to maintain proper adjustment of the bedknife relative to the cutting reel.

This invention also relates to a method of adjusting the bedknife and the cutting reel which embodies many of the steps noted above. For example, a selected physical parameter of either the bedknife or the cutting reel which indicates proper adjustment is selected, a reference value is assigned to this parameter, this parameter is continuously monitored during rotation of the cutting reel, the actual value of the parameter is compared to the reference value, and then an adjustment is made if the actual value and reference value differ. This process continues until the reference value and actual value coincide.

BRIEF DESCRIPTION OF THE DRAWINGS

This invention will be described more fully hereafter in the Detailed Description, when taken in conjunction with the following drawings, in which like refrence numerals refer to like elements throughout.

FIG. 3 is a side view of the adjustment means, bedknife, and the support structure for the bedknife, with portions thereof being in section and portions broken away to better illustrate the actuator means for adjusting the bedknife;

FIG. 4 is a top plan view of a portion of the actuator means shown in FIG. 3, particularly illustrating the attachment of the actuator means to the bedknife;

FIG. 5 is a bottom plan view of the bedknife with portions broken away and shown in section;

FIG. 6 is a schematic view of the control means of this invention used for automatically adjusting the bedknife relative to the cutting reel.

DETAILED DESCRIPTION

Figure 1:
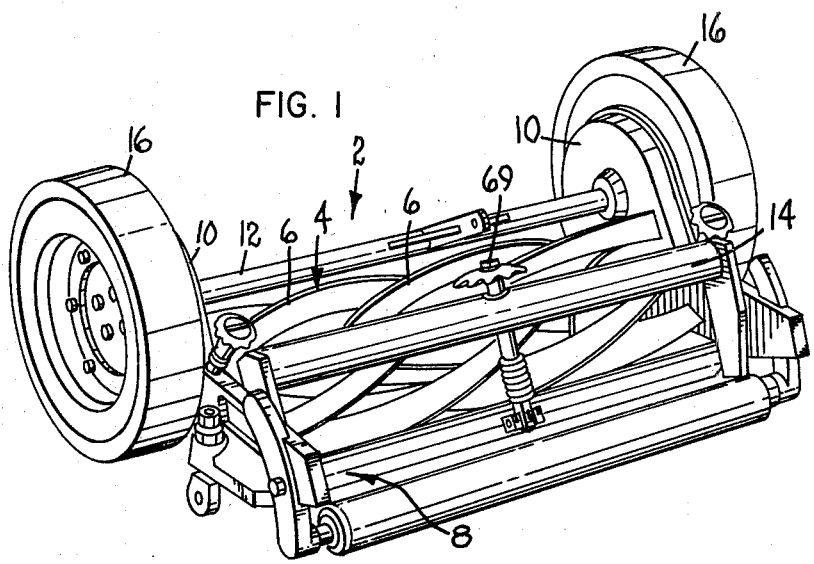
FIG. 1 is a perspective view of a typical reel type mower according to this invention, particularly illustrating a portion of the actuator means for adjusting the bedknife relative to the cutting reel.
Figure 2:
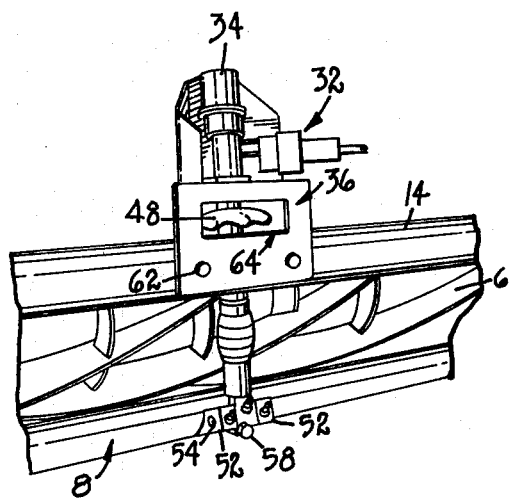
FIG. 2 is a partial perspective view of a portion of the reel type mower shown in FIG. 1, particularly illustrating the actuator means for adjusting the bedknife relative to the cutting reel.

A reel type mower according to this invention is shown as 2 in FIGS. 1 and 2. Mower 2 includes a cutting reel 4 which is rotatable about a substantially horizontal axis. Cutting reel 4 comprises a plurality of curved cutting blades 6, e.g. five or seven of such blades, which extend from one side of reel 4 to the other. Blades 6 are secured together in a unitary manner and held apart by any suitable means, e.g. support spiders or discs spaced along the axis of reel 4 secured to each of blades 6. Mower 2 also includes an elongated bedknife 8. Bedknife 8 cooperates with cutting reel 4 in a manner to be described hereafter to sever grass or other vegetation.

Mower 2 as disclosed herein is generally of the type shown in U.S. Pat. No. 3,680,293 to Klemenahgen and in Canadian Pat. No. 980,133. Both of these patents are incorporated by reference for the various details of mower 2 shown therein. This type of mower 2 is also commercially known as the Spartan ® unit which is manufactured and marketed by The Toro Company of Minneapolis, Minn., the assignee of the present invention. Not all details of mower 2 described in the above mentioned patents are necessary to the present invention. However, mower 2 will be described herein insofar as is necessary for understanding the present invention.

Mower 2 includes a rigid frame made from spaced apart side frame members 10. A front cross tube 12 and rear cross tube 14 extend between and unite side frame members 10. Front cross tube 12 houses an axle which is secured to two traction wheels 16 that support mower 2 for movement over the ground. Cutting reel 4 is pivotally journaled between side frame members 10 at a location offset from traction wheels 26. A suitable drive train (not shown) inside at least one of the side frame members 10 drives or rotates cutting reel 4 as mower 2 is pulled over the ground. Any suitable means for coupling mower 2 to a drive vehicle, such as a trator, may be used.

Referring now to FIG. 3, bedknife 8 comprises a generally triangular bed bar 18. Bed bar 18 extends between opposed left and right side plates 20. A bedknife member 21 having an edge 22 located adjacent to the periphery of cutting reel 4 is rigidly secured to bed bar 18 by threaded securing members 23. While such a construction is preferred, bedknife member 21 need not necessarily be attached to a separate bed bar 18, but could instead comprise a single unitary piece. Thus, the term bedknife refers generally to the element or group of elements which cooperates with cutting reel 4 to sever vegetation.

Referring now to FIGS. 3 and 5, bedknife 8 is pivotally supported on side frame members 10 for movement towards or away from cutting reel 4. Each side frame member 10 has a downwardly extending hanger or bearing member 24. A pivot pin 25 is pivotally received in hanger 24 and has its inner end threadedly secured in one of the side plates 20 of bedknife 8. A rubber or other non-metallic bushing or bearing 26 prevents direct contact between pivot shaft 25 and bearing member 24. In addition, a washer 27 is interposed between side plate 20 of bedknife 8 and bearing member 24. Thus, bedknife 8 is free to pivot about the horizontal axis defined by the aligned pivot shafts 25. This pivotal motion is indicated by the arrows A in FIG. 3. Such pivotal motion will bring the edge 22 towards or away from cutting reel 4.

This invention relates particularly to a an adjustment system or control means 30 for continuously maintaining bedknife 8 properly adjusted to reel 4 even during a mowing operation of mower 2. As shown in FIGS. 3 and 4, part of control means 30 comprises an actuator means 32 for physically moving bedknife 8 towards or away from cutting reel 4. With the exception of an electrical motor 34, a support member or platform 36 for motor 34, and an attached driver 38, actuator means 32 is basically the same as that disclosed in the above referenced patents. However, any suitable type of actuator means for effecting the pivotal motion of bedknife 8 could be used in place of that shown and described herein.

Actuator means 32 comprises a spacer tube 40 extending through and secured to rear cross tube 14. An elongated shaft 42 extends through spacer tube 40. Shaft 42 has a threaded lower end 44 which is threadedly received in the upper end of a sleeve or rod 46. The upper end of shaft 27 has a handle 48 secured thereto. In addition, a compression spring 49 extends between the lower end of spacer tube 40 and two jam nuts 50 held on the threaded lower end 44 of shaft 42. The purpose of spring 49 is to provide some frictional resistance to rotation of shaft 42. Spring 49 and the lower portion 44 of shaft 42 can be covered by a flexible cover member 51. Cover member 51 extends between rear cross tube 14 and rod 46.

The lower portion 44 of shaft 42 is threadedly received in the upper end of rod 46. Rod 46 has a lower end which is positioned between two spaced apart abutments 52 welded to the back of bed bar 18. See FIG. 4. An elongated pin 54 extends through aligned apertures 55 in abutments 52 and a coaxial aperture 56 in the lower end of rod 46. The lower portion of rod 46 is split as at 57 and is then clamped around rod 54 by a capscrew 58 or the like. In addition, two non-metallic half spools or bushings 60 are inserted into each side of aperture 56 in rod 46. Bushings 60 surround pin 54 to prevent it from contacting rod 46. Preferably, bushings 60 are made of nylon and electrically insulate bedknife 8 from rod 46 and the remainder of mower 2. Any suitable electrical insulating materials may be used for bushings 60 however.

Actuator means 32 also includes an electrical motor 34 of any suitable type. Motor 34 is held above handle 48 by the support member 36. Support member 36 is bolted or otherwise secured by threaded securing members 62 to rear cross tube 14. An elongated slot 64 is provided in one of the vertical flanges of support member 36 to allow handle 48 to protrude outwardly. Motor 34 is bolted or otherwise secured to a flange 63 of support member 36 which is directly above rear cross tube 14. Motor 34 includes a downwardly extending motor shaft 65 which extends through an opening 66 in flange 63. Driver 38 is secured to the lower portion of motor shaft 65 by a set screw 67 or the like. Driver 38 has a square sided socket opening 68 which is suited to fit around and engage a square sided nut 69 on the top of handle 48. Thus, whenever motor 34 is actuated, driver 38 will turn handle 48, and thus adjusting shaft 42, via the socket interconnection.

Referring now to FIG. 6, a schematic view of the remainder of the control means 30, which relates to an automatic control circuit, is provided. Bedknife 8 is electrically isolated from cutting reel 4 and the remainder of mower 2. That is so because the only points of contact between bedknife 8 and mower 2, i.e. the bearing members 24 and the pin 54, do not contact directly against bedknife 8 but only through the rubber bearings 26 and the nylon bushings 60. This fact that bedknife 8 is electrically isolated, regardless of how this is done, is an important feature of the present invention as described hereafter.

Control means 30 includes a sensing means, e.g. an electrical contact 70, secured to one of the side plates 20 of bedknife 8. Contact 70 is connected to a source of electrical potential such as battery 72. In addition, cutting reel 4 is connected in any suitable manner to ground as illustrated at 74. Thus, an electrical potential is normally maintained between bedknife 8 and cutting reel 4. The amount of this electrical potential will normally be expressed in terms of a voltage differential, e.g. six volts.

A logic means, such as a programmable micro processor, has an input connected to contact 70. Logic means is indicated as 74 in FIG. 6. This logic means monitors the electrical potential at the bedknife 8 for the purpose of controlling the actuator means 32 in a manner to be described hereafter. Logic means 74 has its own separate means of power, such as a battery 76 and voltage regulator 78. In addition logic means 74 has a means for presetting a pre-determined reference value. This means includes an upper limit set switch 79 and a lower limit set switch 80. The output of logic means 74 is then connected to the electrical motor 34 for actuating the same.

Before describing the operation of logic means 74 in more detail, it would be helpful to consider what happens as cutting reel 4 rotates relative to bedknife 8. As this rotation occurs, the cutting blades 6 sweep across and contact the bedknife at various times. Whenever any one of the cutting blades 6 is in contact with bedknife 8, the electrical potential between the bedknife and cutting reel will disappear. In other words, the voltage appearing or seen at the bedknife 8 would be immediately discharged through ground whenever the cutting blades 6 are in contact with bedknife 8. When there is no contact present, then the voltage applied to bedknife 8 from battery 72 will appear there.

Thus, logic means 74 will see a series of on and off voltages as it monitors the voltage at bedknife 8. Whenever an on voltage is seen by logic means, it means that no contact is present between the bedknife 8 and cutting reel 4. However, whenever an off voltage occurs, then contact has been made between one of the cutting blades 6 and bedknife 8. These on and off voltage conditions can be easily translated into a binary zero or one for sensing and monitoring by the logic means.

Figure 7:
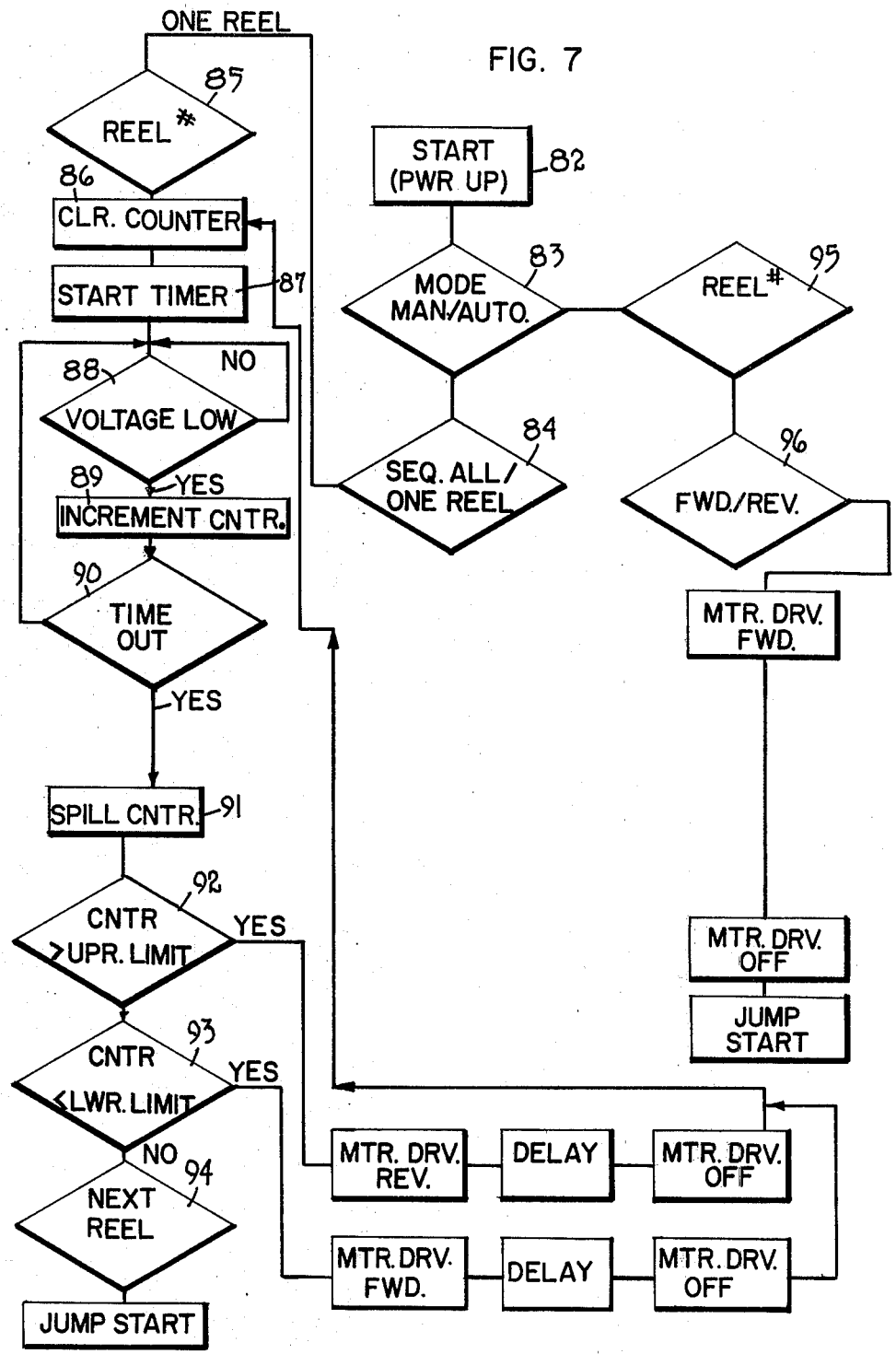
FIG. 7 is a schematic view of the logic means which forms a portion of the control means of FIG. 6 and which determines when the bedknife should be adjusted relative to the cutting reel.

Turning now to FIG. 7, a detailed schematic view of the logic circuitry of logic means 74 is presented. A manual power-up switch 82 is the first step and is used to energize the electrical circuit which defines control means 30 seen at FIG. 6. This switch 82 and other manual switches to be described hereafter can be contained on a control panel accessible to the operator, e.g. on the tractor which is pulling mower 2. A mode selection switch 83 is then thrown in the second step to place the circuit into either a manual mode or an automatic mode. In the automatic mode, control means 30 will function automatically and continuously to keep bedknife 8 properly adjusted relative to reel 4 as described hereafter.

Assuming for the moment that the automatic mode has been designated, the next step in logic means 74 is applicable to those types of mowing machines having more than one reel type cutting unit. In such a product, it is possible to sequence through all the cutting reels from the first to the last and perform a bedknife adjustment operation on each of them. Or, alternatively, it would be possible to go to any selected one of the cutting reels to perform an adjustment on only that reel. Step 84 represents a sequencing switch thrown by the operator to determine whether all the reels should be sequenced in order or whether there has been only one reel selected. We will assume for the purpose of this discussion that only one cutting reel unit has been selected for adjustment by suitable manual activation of the sequencing switch. This being the case the next step 85 represents a reel selector switch that determines which cutting reel has been selected by the operator for adjustment.

The automatic adjustment process itself occurs after step 86. Logic means 74 first performs a counter clearing step 86 and then starts a timer in step 87. Any preset time interval may be used for timer 87. One usable value is 0.4 seconds. After the timer has started, logic means 74 then basically breaks that time interval into a plurality of sampling intervals of much smaller intervals than the length of the time interval itself, e.g. sampling intervals of 35 microseconds. In each of these sampling intervals, logic means 74 asks in step 88 whether the electrical potential between cutting reel 4 and bedknife 8 has disappeared, i.e. whether or not there is a no voltage condition at the bedknife 8. If the answer is no, logic means 74 performs a loop through a step 90 to see whether or not the time interval for timer 87 has expired. If it has not, then it returns, to step 88 and asks the same question again for the next sampling interval, i.e. whether or not a no voltage condition appears at the bedknife. If the answer is yes, however, then a counter 89 is first incremented by one. Following this step logic means 74 then asks in step 90 whether or not the time interval which is timing the timer 87 has expired. If the answer to this is no, then logic means 74 returns for the next sampling interval to step 88 to monitor the electrical potential again. Thus, every 35 microseconds or so, logic means 74 determines whether or not a condition of no voltage appears at the bedknife 8 and counts the number of times that this occurs during the entire preset time period. When the time period finally expires, logic means then spills the contents of counter 89 in step 91 into another section which compares that value to a preset reference value. This reference value is in a range having upper and lower limits preset by switches 79 and 80.

The comparing step is performed in the following manner. The logic means 74 first asks in step 92 whether the contents of counter 89 are greater than the upper limit. If the answer to this is yes, then an actuating signal is generated to drive the motor 34 in one direction, e.g. reverse, for a time delay, e.g. two milliseconds. Then, motor 34 is shut off. Logic means 74 then goes back to the counter clearing step 86 which erases the contents of counter 89. Logic means 74 then repeats steps 87-90 by remonitoring the electrical potential and refilling counter 89. The contents are then compared to the upper limit again. This continues until the answer is negative to the question of whether or not the contents of counter 89 are greater than the upper limit.

After it is determined that the contents of counter 89 are less than the upper limit, logic means 74 then asks in step 93 whether counter is less than the lower limit. If the answer to this is yes, then logic means 74 drives the motor 34 in the opposite direction, e.g. forward through the same time delay pattern. This continues until it has been determined that counter 89 is not less than the lower limit. At this point the contents of counter 89 are now somewhere between the upper and lower limits meaning that bedknife 8 is properly adjusted relative to cutting reel 4. Then, the control means 30 will determine in step 94 whether or not any of the other reels need to be adjusted by referring back to the sequencing step 84. If other of the reels need to be adjusted, the adjustment operation is then performed on them. If not, logic means 74 jumps back to start.

If the manual mode is selected at step 83 instead of the automatic mode, logic means 74 then performs a reel selection step 95 to see which reel selection switch has been thrown by the operator. Then, logic means 74 asks and whether a forward or reverse manual switch 96 has been thrown to indicate in which direction the motor 34 should be driven. The motor 34 is then driven in either a forward or reverse direction for as long as the forward or reverse switch is thrown. When this switch is released, motor 34 is then turned off and logic means 74 jumps back to start.

It has been found that reel 4 and bedknife 8 are properly adjusted relative to one another when they contact each other between 25% and 50% of any pre-determined time interval. Thus, the lower limit can be placed at 25% and the upper limit at 50%. Actually, the lower limit and upper limit will be expressed in terms of binary numbers for logic means 74. However, these numbers will be selected to represent about 25% or 50% of the total possible number of sampled contacts between bedknife 8 and cutting blades 6 within the preset time interval.

For control means 30 to operate properly powered rotation of cutting reel 4 must occur. This should be contrasted with prior art adjustment systems where any adjustment process must be done using only manual rotation of the cutting reel 4 across the bedknife. The invention described herein can also operate in a totally automatic fashion even when cutting reels 4 are rotating. When the control means 30 is placed into its automatic mode, it will constantly keep the bedknife properly adjusted relative to the cutting reel and make whatever adjustments are necessary to insure that this adjustment continues. This automatic control can be overridden by a manual mode selection. In addition, the upper and lower limits for the reference values can be changed depending upon grass conditions to account for the fact that different grass conditions might require a different adjustment of the bedknife relative to the cutting reel. Great flexibility is thus given by the control means of the present invention.

One advantage of this invention is that it enables even an inexperienced operator to maintain good adjustment between the cutting reel and bedknife. This is so because the subjective judgment and adjustment processes of the prior art have been replaced by an objective control means which makes the adjustment process for the operator. Moreover, because the adjustment process operates continuously even during the mowing operation, the adjustment can be maintained if the initial adjustment is lost due to the bedknife striking a rock or the like. This is an advantage not afforded by prior art systems. Finally, a reel to bedknife adjustment as accomplished by control means 30 can be done extremely quickly. The time consuming processes of the prior art, e.g. by manually turning a nut through a trial and error process, has been obviated. Thus, control means 30 according to this invention is laborsaving compared to prior art devices.

Various modifications of this invention will be apparent to those skilled in the art. For example, it has been shown herein that the movable component is the bedknife 8 and that the cutting reel 4, although it rotates, is not otherwise movable. It could be that the bedknife 8 is fixed relative to the cutting reel and the the cutting reel is physically moved to change the adjustment therebetween. In addition, logic means 74 has been shown as being a microprocessor. However, any suitable logic means including any type of electrical or even a hydraulic circuit could be used. Moreover, the time intervals selected for the predetermined time interval and/or the sampling intervals could obviously be changed. Accordingly, the scope of this invention is to be limited only by the appended claims.

We claim:

1. A method for adjusting in a reel type mower the position of a bedknife relative to a cutting reel having at least one cutting element during powered rotation of the cutting reel, which comprises;
   (a) allowing at least some contact between the cutting reel and the bedknife during powered rotation of the cutting reel which contact generates a physical parameter in either the bedknife or cutting reel which indicates the degree of adjustment between the cutting reel and the bedknife;
   (b) selecting a proper reference value for the parameter which coincides with proper adjustment of the bedknife relative to the cutting reel;
   (c) continuously or intermittently monitoring the actual value of the parameter during powered rotation of the cutting reel;
   (d) determining whether the actual value of the parameter differs from the reference value b;
   (e) adjusting the relative positions of the cutting reel and the bedknife whenever the actual value of the parameter has been determined to differ from the reference value; and (f) repeating steps c-e until the actual value of the parameter and the reference value coincide.

2. A reel type mower, which comprises:
(a) rotatable cutting reel having at least one cutting element;
(b) an elongated bedknife adjacent the cutting reel for cooperation with the cutting reel to sever vegetation between the bedknife and the cutting element, wherein either the bedknife or the cutting reel is movable relative to the other component to define a movable component whose position can be varied relative to the other component, and wherein the movable component is able to move sufficiently close to the other component such that at least some contact occurs between the cutting element of the cutting reel and the bedknife during rotation of the cutting reel; and
(c) control means for adjusting the position of the movable component during rotation of the cutting reel, wherein the control means includes:
  (i) means for monitoring during rotation of the cutting reel a selected physical parameter of either the cutting reel or the bedknife which parameter is generated by the contact between the cutting reel and the bedknife and which parameter indicates whether or not the bedknife is properly adjusted relative to the cutting reel; and
  (ii) actuator means controlled by the monitoring means for moving the movable component towards or away from the other component to maintain proper adjustment of the bedknife relative to the cutting reel.

3. A reel type mower, which comprises:
(a) a rotatable cutting reel having at least one cutting element;
(b) an elongated bedknife adjacent the cutting reel for cooperation with the cutting reel to sever vegetation between the bedknife and the cutting element, wherein either the bedknife or the cutting reel is movable relative to the other component to define a movable component whose position can be varied relative to the other component; and
(c) control means for adjusting the position of the movable component during rotation of the cutting reel, wherein the control means includes:
  (i) means for monitoring during rotation of the cutting reel a selected physical parameter of either the cutting reel or the bedknife which indicates whether or not the bedknife is properly adjusted relative to the cutting reel;
  (ii) actuator means controlled by the monitoring means for moving the movable component towards or away from the other component to maintain proper adjustment of the bedknife relative to the cutting reel; and
  (iii) wherein an electrical potential is normally maintained between the bedknife and the cutting reel with this potential disappearing whenever the cutting element is in contact with the bedknife, and wherein the selected physical parameter which is monitored is the electrical potential.

4. A reel type mower as recited in claim 1, wherein the electrical potential is monitored at the bedknife.

5. A reel type mower as recited in claim 1, wherein the monitoring means includes logic means for determining whenever the selected parameter has an actual value which is different from a desired value corresponding to proper adjustment of the bedknife relative to the cutting reel and for then selectively operating the actuator means to adjust the position of the movable component.

6. A reel type mower as recited in claim 5, wherein the logic means includes:
(a) means for timing a predetermined time interval;
(b) means for containing a reference value corresponding to the number of times the electrical potential between the bedknife and the cutting reel disappears within the time interval when the bedknife and cutting reel are properly adjusted relative to one another;
(c) means for counting the number of times the electrical potential between the bedknife and the cutting reel actually disappears during rotation of the cutting reel within the time interval to derive an actual value;
(d) means for comparing the actual value to the reference value; and
(e) means for selectively operating the actuator means whenever the actual value is different from the reference value.

7. A reel type mower as recited in claim 6, wherein the actuator means comprises an electrically operable motor energized by an electrical signal from the logic means.

8. A reel type mower as recited in claim 6, wherein the reference value is in a band having upper and lower limits.

9. A reel type mower as recited in claim 8, wherein the lower and upper limits have values which correspond to conditions in which the bedknife and the cutting element are in contact with one another such that the electrical potential disappears for approximately 25% and 50%, respectively, of the time interval.

10. A reel type mower as recited in claim 6, 8 or 9, wherein the logic means includes means for manually adjusting the reference value to account for varying vegetation conditions.

11. A reel type mower as recited in claims 3 or 5 wherein the bedknife is movable relative to the cutting reel to define the movable component.

12. A reel type mower as recited in claim 11, wherein the actuator means includes:
(a) a rotatable screw adjustor for moving the bedknife relative to the cutting reel; and
(b) a motor mechanically connected to the adjustor screw for rotating the same upon operation by the monitoring means.

13. A reel type mower as recited in claim 3, wherein the control means has both a manual mode for manual actuation by the operator and an automatic mode in which the control means operates without any manual action by the operator.

14. A reel type mower, which comprises:
(a) a rotatable cutting reel having at least one cutting element;
(b) an elongated bedknife adjacent the cutting reel for cooperation with the cutting reel to sever vegetation between the bedknife and the cutting element, wherein either the bedknife or the cutting reel is movable relative to the other component to define a movable component whose position can be varied relative to the other component;

(c) means for supporting the cutting reel and the bedknife for movement over a ground surface during a mowing operation;

(d) means for rotating the cutting reel relative to the bedknife during the mowing operation to sever the vegetation substantially continuously; and (e) means for automatically maintaining the bedknife and the cutting reel properly adjusted relative to one another during the mowing operation by moving the position of the movable component as needed relative to the other component, wherein the maintaining means includes means for holding the cutting reel sufficiently close to the bedknife such that at least some contact occurs between the bedknife and the cutting reel during the mowing operation.

15. A reel type mower as recited in claim 14, wherein the maintaining means comprises an electrical circuit that continuously monitors during the mowing operation a selected physical parameter of either the cutting reel or the bedknife which indicates whether or not the bedknife is properly adjusted relative to the cutting reel.

* * * * *

UNITED STATES PATENT AND TRADEMARK OFFICE
CERTIFICATE OF CORRECTION

PATENT NO. : 4,335,569
DATED : June 22, 1982
INVENTOR(S) : Keeney et. al.

It is certified that error appears in the above—identified patent and that said Letters Patent is hereby corrected as shown below:

In Column 1, line 56, "edknife" should read --bedknife--.
In Column 3, line 66, "trator" should read --tractor--.
In the drawings, sheet 3, Fig. 7, the lead line labeled No emanating from the VOLTAGE LOW box should be directed to the TIME OUT box, such that the pertinent portion of Fig. 7 now reading 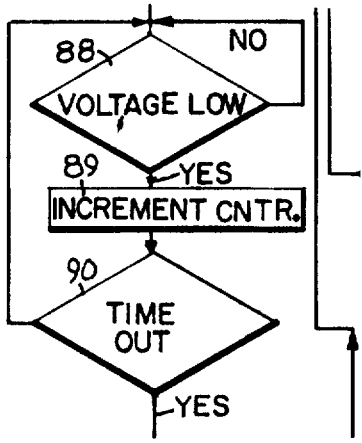   should read 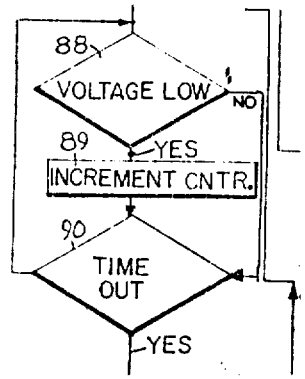

Signed and Sealed this

First Day of February 1983

[SEAL]

Attest:

GERALD J. MOSSINGHOFF

Attesting Officer   Commissioner of Patents and Trademarks